Jan. 26, 1932.   W. E. URSCHEL   1,843,095
POWER DRIVEN CULTIVATOR
Filed May 27, 1920   2 Sheets-Sheet 1
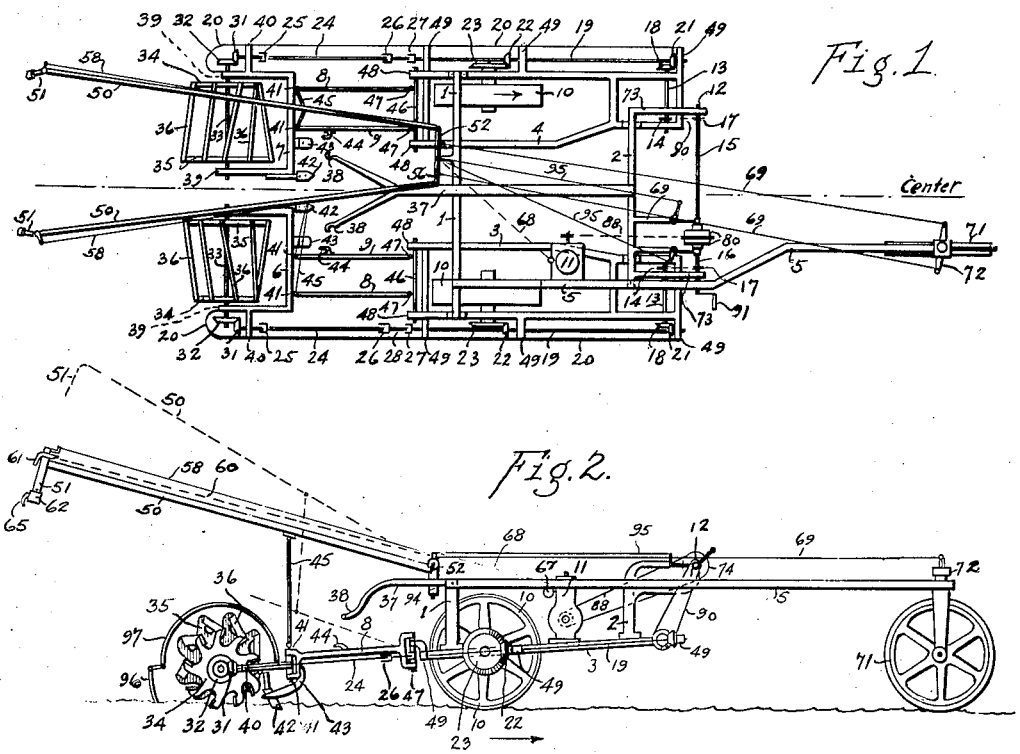
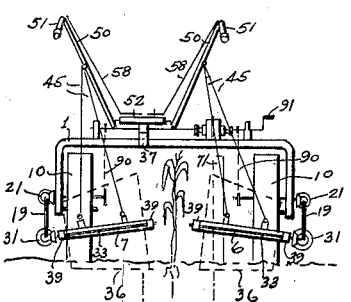
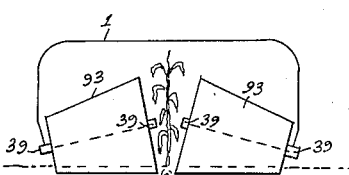
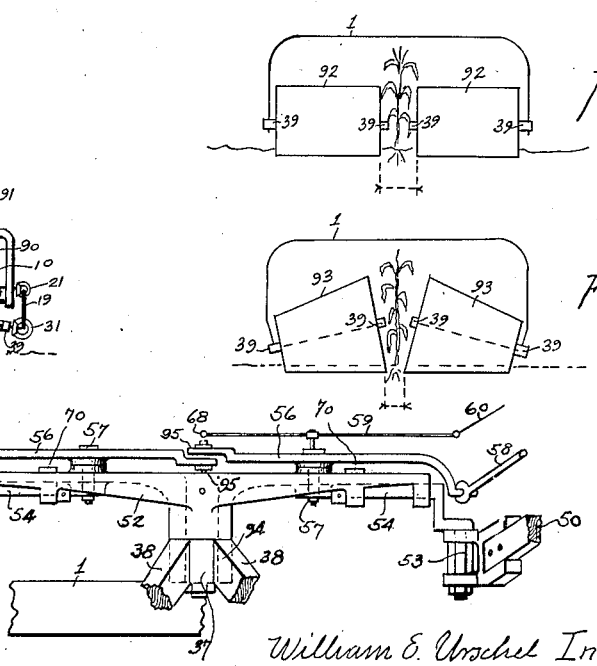
William E. Urschel Inventor
By N. S. Amstutz
Attorney Jan. 26, 1932.  W. E. URSCHEL  1,843,095
POWER DRIVEN CULTIVATOR
Filed May 27, 1920  2 Sheets-Sheet 2
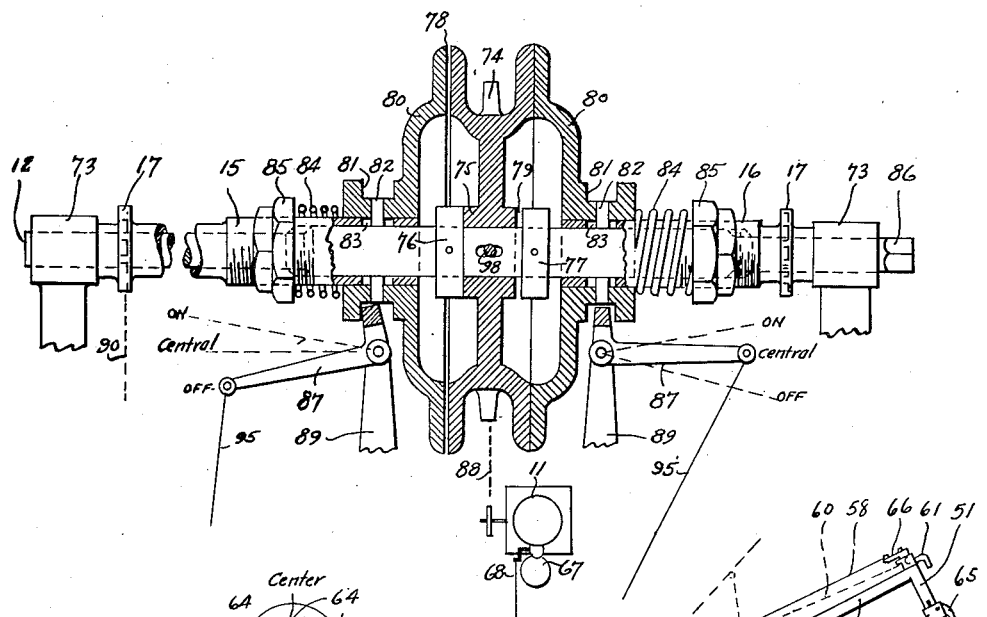
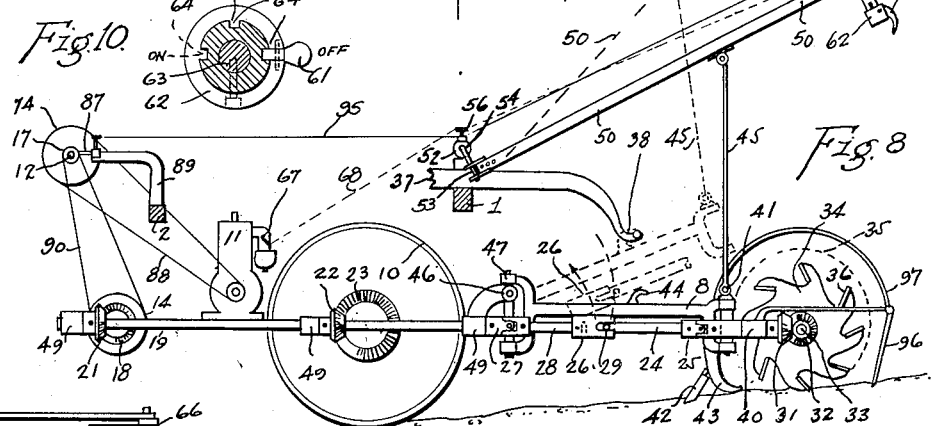
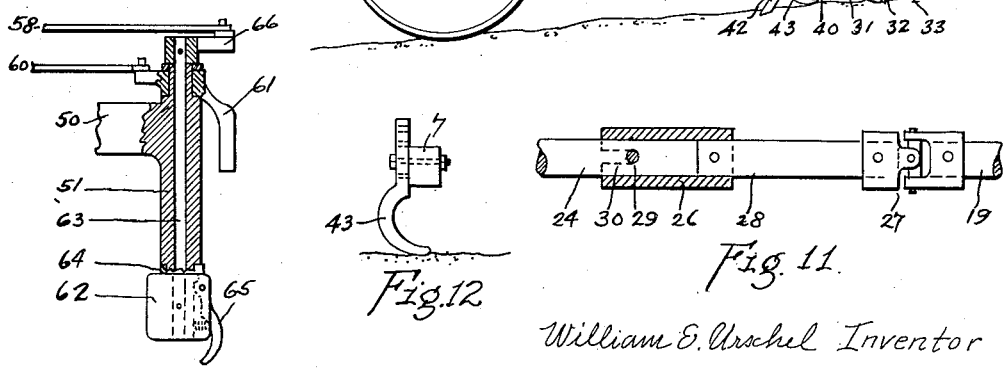
William E. Urschel Inventor
By N. S. Amstutz
Attorney Patented Jan. 26, 1932

1,843,095

UNITED STATES PATENT OFFICE

WILLIAM E. URSCHEL, OF VALPARAISO, INDIANA

POWER DRIVEN CULTIVATOR

Application filed May 27, 1920. Serial No. 384,723.

This invention relates to improvements in cultivators, and particularly to power cultivators adapted to cultivate opposite sides of a row concurrently.

In this invention it is contemplated that there shall be the provision of instrumentalities capable of operating upon both sides of a row whereby to concurrently cultivate the soil is proximity to and upon each side of a growing crop.

Cultivators of this type generally are cumbersome and heavy in construction, and such cultivators are inclined to pack the soil as an incident to their movement thereover.

An object of the present invention is to simplify the construction and improve the operation of devices of the character mentioned.

Another object of the invention is the provision of fully adjustable cultivators adapted to concurrently till the soil upon each side of a row of growing crops.

A further object of the invention is the provision of a cultivator which is power-driven and in which either the cultivating tool or the traction wheels may provide the forwardly impelling force.

An additional object of the invention is the provision of a power-driven wheeled frame provided with a plurality of independently adjustable cultivators, such cultivators to be alike in nature or different in character as desired.

A still further object of the invention is the provision of a wheeled frame having power-driven cultivators associated therewith whereby to effect the forward driving thereof independently of the traction wheels operating concurrently therewith.

Still a further object of the invention is the provision of a motor driven wheeled frame supporting cultivating implements and having dual control mechanisms to independently direct the steering of the frame and the operation of the cultivating implements.

An added object of the invention is the provision of an instrumentality of the character set forth in the preceding paragraph and in which the various control mechanisms are actuated by movements similar to those required to operate a horse or tractor drawn cultivator.

An additional object of the invention is to provide a power actuated cultivator adapted to be impelled by the cultivating implements thereon and which possesses means for rendering such cultivating implements inoperative, in combination with independently operable traction means.

A further object of the invention is the provision of a power actuated cultivator having two traction systems, one of said systems operating as a braking means when the other is effective.

In the accompanying drawings:

Figure 1 is a diagrammatic plan of an assembled cultivator embodying features of the present invention.

Figure 2 is a side view in elevation of the cultivator disclosed in Figure 1.

Figure 3 is an end view in elevation showing the relation of the raised frame to a row of plants.

Figure 4 is a diagram of a pair of uniform diameter or cylindrical cultivators.

Figure 5 is a diagrammatic representation of variable diameter or conical cultivators.

Figure 6 is an elevation of the steering handle support for the cultivator showing the throttle and clutch control connections in association therewith.

Figure 7 is a sectional view in elevation of a clutch mechanism employed in connection with the cultivator.

Figure 8 is a view in elevation of the driving connection to the cultivators, there being means for disengaging the operative connection when the cultivators are raised by the handles.

Figure 9 is a detail view in elevation of the free end of a steering handle showing the clutch and throttle controls.

Figure 10 is a cross-sectional view of the clutch control portion of a steering handle.

Figure 11 is a fragmentary view of a disengaging sleeve used on the cultivator drive shafts.

Figure 12 is a detail view in elevation of a control mechanism for limiting the depth of cultivation.

The structure selected for illustration of the invention comprises any suitable wheeled frame having an engine supported thereon in a position consistent with technical practice. The frame is preferably of sufficient height to pass over corn or other crops so that there will be no likelihood of occasioning damage thereto.

The frame, in this instance, is composed of two cross members, 1 and 2, supported by subsidiary frames 3 and 4, there being a median bar 5 secured to the cross member 1 and 2. The bar 5 extends forwardly beyond its supports to receive a singular steering wheel 71 mounted in a furcated standard 72 which is rotatively associated with the forward extremity of the bar 5.

Driving wheels 10, in this instance two in number, are journalled in suitable bearings provided in the subsidiary frames 3 and 4, thereby elevating the primary frame from the soil over which it traverses under the impelling force of an engine or other suitable motive power 11. Upon the frames 3 and 4 are bearings 49 in which driving shafts 19 are journalled, one of said bearings being at the front of each of said frames and adjacent to bevel pinions 21, a second being at the rear and adjacent to an universal joint 27, and a third near the center of said shaft 19 and in juxtaposition to bevel pinions 22. Pinions 22 mesh with bevel gears 23 which are secured to the axles of driving wheels 10.

At opposite sides and to the rear of the main body of the device cultivator frames 6 and 7, each of which comprises a transverse portion, are two rearwardly projecting arms which may be integrally formed and between which arms rotatable cultivators 93 are mounted. Said cultivators 93 are disposed upon shafts 33 which are journalled in the frames 6 or 7. Said cultivator frames 6 and 7 are flexibly connected to frames 3 and 4 in order to permit of their movement both vertically and transversely. In the present instance, such flexible connection is obtained by securing to frames 6 and 7 parallel bars 8 and 9.

Said bars 8 and 9 are secured to frames 6 and 7 by vertically aligned bearings 41, and at the other end of said each pair of rods 8 and 9 is a horizontal rod or bar 46 each end of which is journalled in bearings 48 at the back end of frame 3 and 4. Intermediate each bar 46 and the pair of rods 8 and 9 secured thereto is a vertically disposed journal or bearing pivot 47. Upon each bar 9 is a hook 44 by which said bar may be suspended upon a hook 38 forming a part of the bifurcated rear end of a longitudinal centrally disposed frame member 37, the purpose of providing such suspension being to secure the cultivators in an inoperative position when not in actual use.

The cultivators 93 here shown approximate the frustum of a cone and are oppositely disposed. Said cultivators comprise one head 34 of less diameter than the opposite head 35, joined together by spirally formed peripheral knives or cultivator blades 36. Said heads 34 and 35 are mounted upon inclined shafts 33 which rotate freely in the bearings 39 of frames 6 and 7 as hereinbefore indicated.

Said shafts 33 are driven from main shafts 19 through the agency of gears 32 at the outer end of said shafts 33 and which mesh with a short shaft 31 journalled in bearings 40 and connected to drive shaft 24 by a universal joint 25, which drive shaft 24, is in turn provided with a connecting member or clutch now to be described, whereby it may be made to rotate with shaft 28 which latter shaft is connected by universal joint 27 to drive shaft 19.

The front end of shaft 24 is provided with diametrically disposed driving pins 29 which may be seated in oppositely arranged slots 30 in a sleeve 26 which is secured to and adapted to rotate with shaft 28. Shafts 24 may be moved longitudinally in the sleeves 26 whereby to withdraw the pins 29 from the slots 31, thus disengaging the shafts 24 from shafts 28. Such disengagement occurs as an incident to cultivators 93 being lifted to an inoperative position but the movement of shaft 24 relatively to shaft 28 is not so great that the former is entirely withdrawn from the sleeve 26.

The purpose in view when such disengagement was provided is readily understood from an examination of Figure 8 wherein dotted lines are used to show various parts in the elevated position. The separation is obtained by the change in the position of the center of bars 46 with respect to the center of the universal joints 27. Such change in position is sufficient to cause the pins 29 to disengage the slots 30. The cultivators 93 are raised, in the process of such disengagement, by handles 50 which are connected by links 45 to the frame work supporting said cultivators, the left being high to admit of the hooks 38 and 44 engaging one another.

The handles 50 also serve to control the steering wheel 71 whereby to determine the direction the cultivator is impelled by the drive wheels 10. Each of said handles is adapted to move the cultivator controlled by it vertically independently of the other. In this manner, either of the cultivators may be lifted over obstacles, or to facilitate general propulsion. Either cultivator may be moved sideways by means of the handle controlling it without reference to the other handle.

The cultivator, for steering purposes, is provided with rods 69 to connect the steering head 72 to ears 70 on opposite sides of the center of a bar or yoke 52 pivoted on a projection or lug of frame 1. Thus, when the right handle 50 is pulled back the entire cultivator is moved to the right and when the left handle 50 is pulled back, the direction of the cultivator is changed to the left. As one handle 50 moves forwardly the other one moves rearwardly because each is attached to the yoke 52 pivoted at 94.

Each of the cultivators 93 may be moved sideways independently of the other. As previously stated, each of the links 45 is secured to a handle 50 at one end, and to the superstructure of the cultivator 93 at the other. Each handle 52 is pivoted for arcuate movement in a generally horizontal plane, through a pin 53 which connects the handles 50 to the opposite ends of bar 52. Said pins 53 are generally L shaped and one of the legs thereof is rotatably mounted in the ends of the bar 52 to allow handles 50 to be raised independently of each other.

The application of driving power, and the control of the engine throttle 67 also is effected from controls upon or within the handle grips 51. Upon the right handle 50 is a power control for the right driving wheel 10. Upon the left handle 50, there is a control of the left driving wheel 10. The throttle control is designated 61 and may be placed upon either handle.

So that the up and down, and the sidewise movements, of the handles 50 upon their pivots 53 and 54 will not derange the clutch and throttle control rods, two arms 56 are pivoted at 57 upon the bar 52. The bar 52 is provided with a pin 55 to form pivot 94 on the bar 37. Arms 56 at their outer ends are bent down and terminate in a pivotal connection for clutch rods 58 directly above the center of pins 53 and also in the same horizontal plane as the center of pins 54. With this arrangement, the handles 50 may be freely moved in any direction without changing the position of the control arms 56, the handle rods 58, and/or the clutch rods 95. In order that movement of the bar 52 will not affect the position of arms 56, the inner ends of the latter terminate directly above the center of pivote pin 55.

Grips 51 upon handles 50 project downwardly from said handles 50 at approximately right angles. Said grips 51 are hollow. A stem 63 passes through the entire length of each grip. At the bottom end of said stems 63, knobs 62 are secured and at the upper end of said stems cranks 66 are formed to receive clutch rods 58.

Between crank 66 and handle 50 on either side of the device a throttle lever 61 is mounted. Said lever 61 has a thumb extension and is adapted to actuate a rod 60. The rod 60 in turn moves arm 59 which is pivoted upon the clutch arm 56. Arm 59 controls the movement of a rod 68 which is connected to the engine throttle 67.

At the bottom of the grips 51, knobs 62 are slotted to receive clutch controls 65 which are normally held in engagement with notches 64 by means of any suitable spring. When in center position (Figure 10) the parts are in neutral. When in the right hand position, the clutch is disconnected, and when moved to the left hand notch there is a positive clutch engagement. Such movement of the knob 62 must be made while the lever 65 is pressed inward. This movement of the knob 62 is transmitted through stem 63, crank 66, rod 58, arm 56 and rod 95 to a bell crank 87 pivoted on a support 89 which projects forwardly from cross frame 2. Bell crank 87 is adapted to impinge upon and move a collar 81 forming a part of a disk clutch 80. A pair of such clutches 80 is employed (Figure 7) and each clutch is adapted to control the transmission of motive force to one of cultivators 93.

Driving connections from the engine 11 are provided through a chain 88, or by other means, to a sprocket 74 upon clutch 80. A hub 75 upon said sprocket 74 is slidably feathered on a shaft 12 between collars 76 and 77 which are firmly secured to shaft 12.

A clearance 79 is left between the hub 75 and collars 76 and 77 which clearance is fugitive according to which clutch disk 80 is in engagement with the driven sprocket 74. As is shown in Figure 7, there is a clearance 78 between the left drive disk 80 and the companion clutch face of the sprocket 74. The opposite clutch face of sprocket 74 is shown in engagement with the right disk 80 because of the pressure thereupon of a spring 84, the function of which will be later stated. The opposite clutch systems are duplicates of one another, except in the minor detail of the length of sprocket wheel sleeve 15 on the left and sprocket wheel sleeve 16 on the right of Figure 7. Were the engine 11 mounted centrally upon the frame 3, said sleeves 15 and 16 would be duplicated.

When both of disks 80 engage the sprocket 74, each of the drive wheels 10 are rotated. The cultivator then moves forward in a straight line due to the fact that both springs 84 are operative while both shifting cranks 87 are in neutral position. Power is transmitted to the sleeves 15 or 16 by means of pins 82 placed in each of the hubs of disks 80. Said pins 82 pass into slots 83 in said sleeves 15 and 16.

Thus, as the sleeves 15 and 16 rotate with the shaft 12, which is supported in bearings 73 formed as extensions of the cross frame 2, motion is communicated to the tractor wheels 10 by means of chains 90 which pass about sprockets 17 on sleeves 15 and 16 to sprockets 14 on counter shafts 13 (see Figure 1) and from shafts 13, the power is transmitted to shafts 19 through gears 21 on said shafts 21 and intermeshing gears 18 on said counter shafts 13.

An enclosing casing 20 of any desired type may be used about the shafts 19 and 24, the bearings for said shafts, and their related gears, to protect them from dirt, dust, and foreign matter.

The cultivators 93 are limited in the depth to which they may penetrate the soil by any suitable adjustable shoes such as 43 shown in Figure 12. Stationary shovels 42, of any well known form, may be attached to the minor members of frames 6 and 7 when found desirable. Hoods 97 may be placed over the cultivators, and rakes 96, or any other desired attachments, may be suitably secured so as to follow the cultivators 93.

Clutch sleeves 15 and 16, and their correlated disks 80 are movable endwise of shaft 12 by springs 84 which springs are subject to adjustment by means of nuts 85.

The engine 11 should be started when both clutch disks 80 are held inoperative because the handle 65 is held in engagement with the central notch 64 shown in Figure 10. The engine may be started by means of a crank 91 temporarily placed on the end 86 of shaft 12 whereby to rotate said shaft. The rotation of said shaft will be imparted to sprocket 74 through the pin 98 in a slot of said shaft and whose ends are seated in hub 75.

Figures 4 and 5 are used to contrast the difference between plain cylindrical cultivators 92 and the conical ones 93 herein described. The latter will work much closer to a row than the former, with less danger of the inner bearings 39 damaging the plants.

The operation of this power driven cultivator is quite simple. When it is moving straight forward, both drive wheels 10 are being driven at the same speed, which speed may be changed as desired by means of the engine throttle. At the same time, the rotating cultivators 93 can be moved toward or from the row of plants quite independently of each other. Such sidewise movement compensates for any lack of straightness which may be found in the row under cultivation. At the end of a row, the cultivators are raised into a supported and inoperative position by lifting the handles. The rear of the machine may then be depressed so as to raise the steering wheel off the ground by using the axles of the driving wheels as pivots. In this relation of parts, either one of the drive wheels may be set into motion according to the direction it is desired to turn, when the whole machine will be turned in a short radius around the idle driving wheel as a center.

If desired a seat may be attached in proper relation to the handles on which the operator may ride and the clutch system shown may be substituted by any well known type of motor car universal drive with a single clutch control without departing from the spirit of my invention.

The cultivators or diggers 93 located in the rear of the drive wheels 10 rotate in the same direction, but at a considerably higher speed than the drive wheels. By so doing, the cultivators are caused to dig into the ground in endeavoring to overtake the traction wheels, which, of course, retard forward movement at the speed of the cultivators. This characteristic differentiates the present device from a horse drawn or tractor pulled implement, because in such cases the propelling medium is wholly extraneous to the implement. To force the diggers to efficiently do their work with such a light weight machine as the machine here shown is, it has been found that there should be a definite speed ratio between the drive wheels 10 and the cultivators 93. An interdependent resultant speed of traverse and work is secured which, without having a related ratio of rotation between the drivers 10 and diggers 93, is not attainable.

What I claim is:—

1. In a power cultivator, a frame, an engine carried by said frame, driving wheels upon which said frame rests, a plurality of rotatable cultivators, means for selectively applying the power of said engine to said driving wheels independently of each other or to both at the same time, means for operating said cultivators as an incident to the operation of said driving wheels, means for lifting said cultivators from the ground, and means for disconnecting the driving force from said cultivators as an incident to their elevation, said lifting means being adapted to control the vertical and lateral movement of said cultivators independently of each other.

2. A power driven cultivator comprising a frame having driving wheels, an engine carried upon said frame, a plurality of rotary cultivators, operating means intermediate said engine and said driving wheels and rotary cultivators, means for selectively applying the power of said engine to certain of said driving wheels and cultivators, handles for lifting and laterally swinging said cultivators independent of each other, and means for automatically disconnecting said cultivators from said operating means as an incident to lifting said cultivators.

3. The combination with a power cultivator including frame having mounted thereon an engine, steering wheel, driving wheels, and rotatable cultivating members adapted to be activated by said engine and to be disconnected therefrom, of a manipulatory apparatus therefor comprising handles for an operator and adapted to steer said frame through said steering wheel and connected to said cultivating members to impart horizontal and vertical movement thereto, the latter movement being adapted to connect and disconnect said cultivators from said engine and the former movement to regulate the position of said cultivators relative to plants under cultivation.

4. A power cultivator comprising a prime mover, independently actuated driving wheels driven by said prime mover, a plurality of approximately horizontal rotatable cultivators, each of said cultivators being detachably connected to said prime mover and conjointly driven thereby with each driving wheel, frames for said cultivators, and means for moving said cultivator frames sideways, vertically and relatively one to another whereby to position the ground manipulating parts of said cultivators to plants under cultivation, the detachable connection between said cultivators and said prime mover having members actuated as an incident to extended vertical adjustment of said frame moving means to disconnect said cultivators and prime mover.

5. A power driven cultivator comprising a frame, an engine supported thereon, driving wheels attached thereto, a plurality of cultivators, actuating means from said engine to each of said driving wheels, each of said actuating means being adapted to concurrently actuate one of said cultivators, means for selectively applying the power of said engine to a predetermined driving wheel, means attached to said frame for controlling the position of each of said cultivators independently of one another, and means for disconnecting said actuating means from each of said cultivators as an incident to said cultivators being moved from an operable position.

6. A power driven cultivator comprising a frame, a prime mover thereon, a driving wheel for such frame connected to said prime mover, a rotatable tool attached to said frame and suitable for driving said frame, and means for connecting said tool to said prime mover for driving said frame at a speed greater than the speed of said frame when driven by said driving wheel.

7. A power cultivator comprising a frame, an engine thereon, driving wheels for moving and supporting said frame, suitable connecting means between said engine and said wheels, a plurality of cultivators attached to said frame for universal adjustment relative thereto, means for conveying power from said engine to said cultivators, means for adjusting said cultivators independently of one another, and means for connecting and disconnecting the power from said engine to each of said cultivators as an incident to such cultivator attaining a predetermined vertical adjustment.

8. A power cultivator comprising a prime mover, a suitable frame, a driving wheel upon said frame and actuated by said prime mover, a rotatable tool detachably connected to said prime mover and supported by said frame, and means for conjointly connecting said prime mover to said driving wheel and to said tool whereby said driving wheel impels said frame at a lower speed than the speed imparted thereto by said tool.

9. A power cultivator comprising a frame, an engine thereon, driving wheels for moving and supporting said frame, rotatable tools adapted to be driven by said engine, members having universal movement intermediate said tools and said frame, and handles having depending parts extending to said tools for adjusting said tools to a crop, the lifting of said handles rendering said tools inoperative by said engine.

10. A power cultivator comprising a prime mover, a frame, driving wheels upon said frame, independent power transmitting connections intermediate said prime mover and each driving wheel, a supporting wheel in advance of said driving wheels for steering said frame, a steering element having handles operably connected to said steering wheel, rotary cultivators connected to said prime mover, each of said cultivators being paired with a driving wheel and attached to said frame for universal movement independently of each other, and connecting means intermediate one of said cultivators and one of said handles to control the position of each of said cultivators independently of the other.

11. In combination with a frame, a prime mover, a pair of soil digging and propelling members upon said frame and operable independently of one another, a pair of driving wheels also upon said frame and rotating more slowly than said digging and propelling members, and a guiding member comprising a steering wheel and control means therefor, said control means including instrumentalities operable upon movement of said control means for connecting and disconnecting said soil digging and propelling members from said prime mover and for adjusting said soil digging and propelling members relatively to one another.

In testimony whereof I affix my signature.

WILLIAM E. URSCHEL.